(12) United States Patent
Bang et al.

(10) Patent No.: US 11,112,637 B2
(45) Date of Patent: Sep. 7, 2021

(54) LIQUID CRYSTAL DISPLAY DEVICE

(71) Applicant: LG Display Co., Ltd., Seoul (KR)

(72) Inventors: Jung-Hun Bang, Paju-si (KR); Jong-Seo Yoon, Paju-si (KR); Dong-Il Chung, Paju-si (KR); Byeong-Jun Lee, Paju-si (KR); Kyung-Tai Ko, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1 day.

(21) Appl. No.: 16/208,404

(22) Filed: Dec. 3, 2018

(65) Prior Publication Data

US 2019/0179188 A1    Jun. 13, 2019

(30) Foreign Application Priority Data

Dec. 13, 2017    (KR) .................. 10-2017-0171126

(51) Int. Cl.
*G02F 1/1333*    (2006.01)
*G02F 1/1335*    (2006.01)
(Continued)

(52) U.S. Cl.
CPC .... *G02F 1/13338* (2013.01); *G02F 1/133528* (2013.01); *G06F 3/044* (2013.01); *G06F 3/0412* (2013.01); *G06F 3/0443* (2019.05); *G02F 1/13306* (2013.01); *G02F 1/134309* (2013.01); *G02F 1/136286* (2013.01); *G02F 2202/28* (2013.01)

(58) Field of Classification Search
CPC .. G02F 1/1333; G02F 1/1335; G02F 1/13338; G02F 1/133528; G06F 3/041; G06F 3/044; G06F 3/0412
See application file for complete search history.

(56) References Cited

U.S. PATENT DOCUMENTS 7,301,523 B2    11/2007    Kamei
7,855,709 B2    12/2010    Kamei
(Continued)

FOREIGN PATENT DOCUMENTS

CN    1573444 A    2/2005
CN    101122647 A    2/2008
(Continued)

OTHER PUBLICATIONS

China National Intellectual Property Administration, Office Action, CN Patent Application No. 201811477700.4, dated Apr. 27, 2021, 15 pages.

*Primary Examiner* — William Boddie
*Assistant Examiner* — Jeffrey Parker
(74) *Attorney, Agent, or Firm* — Fenwick & West LLP

(57) ABSTRACT

A liquid crystal display device includes: a liquid crystal panel in which a display region in which a plurality of touch blocks are arranged and a non-display region around the display region are defined, wherein the liquid crystal panel includes a first substrate and a second substrate facing each other and a polarizer attached to an outer surface of the first substrate, and a touch electrode is provided in each of the plurality of touch blocks; and a cover window attached to an outer surface of the polarizer through an adhesive layer, wherein the cover window has a size greater than that of the display region and smaller than or equal to that of the first substrate.

11 Claims, 4 Drawing Sheets

(51) Int. Cl.
  *G06F 3/041* (2006.01)
  *G06F 3/044* (2006.01)
  *G02F 1/133* (2006.01)
  *G02F 1/1343* (2006.01)
  *G02F 1/1362* (2006.01)

(56) References Cited

U.S. PATENT DOCUMENTS

| | | | |
|---|---|---|---|
| 9,778,529 B2 | 10/2017 | Chan et al. | |
| 9,965,121 B2 | 5/2018 | Teranishi et al. | |
| 10,275,107 B2 | 4/2019 | Teranishi et al. | |
| 10,367,173 B1* | 7/2019 | Wu | G02B 1/14 |
| 10,838,558 B2 | 11/2020 | Lee et al. | |
| 2004/0246435 A1* | 12/2004 | Kamei | G09G 3/3413 |
| | | | 349/199 |
| 2008/0048967 A1 | 2/2008 | Kamei | |
| 2008/0259230 A1* | 10/2008 | Miyakita | B29D 11/0073 |
| | | | 349/8 |
| 2015/0219950 A1* | 8/2015 | Kim | G02F 1/13363 |
| | | | 349/96 |
| 2016/0113106 A1* | 4/2016 | Kim | H05K 1/028 |
| | | | 361/749 |
| 2016/0147339 A1* | 5/2016 | Teranishi | G06F 3/0446 |
| | | | 345/174 |
| 2016/0306224 A1* | 10/2016 | Ishikawa | G02F 1/133512 |
| 2016/0306460 A1 | 10/2016 | Lee et al. | |
| 2017/0102491 A1* | 4/2017 | Lee | G02B 1/14 |
| 2018/0004056 A1 | 1/2018 | Park et al. | |
| 2018/0224973 A1 | 8/2018 | Teranishi et al. | |
| 2018/0292708 A1* | 10/2018 | Huang | G02F 1/13454 |
| 2019/0123125 A1* | 4/2019 | Seki | H01L 51/5246 |
| 2021/0057491 A1 | 2/2021 | Lee et al. | |

FOREIGN PATENT DOCUMENTS

| | | |
|---|---|---|
| CN | 205427814 U | 8/2016 |
| CN | 106057852 A | 10/2016 |
| CN | 106773209 A | 5/2017 |
| KR | 10-1691885 B | 2/2012 |
| KR | 10-1717653 B | 10/2012 |
| KR | 10-2016-0053251 A | 5/2016 |
| KR | 10-2016-0091497 A | 8/2016 |

* cited by examiner

LIQUID CRYSTAL DISPLAY DEVICE

CROSS-REFERENCE TO RELATED APPLICATIONS

The present application claims the priority benefit of Republic of Korea Patent Application No. 10-2017-0171126 filed on Dec. 13, 2017, which is hereby incorporated by reference in its entirety.

BACKGROUND

Field of Technology

The present disclosure relates to a liquid crystal display device, and more specifically, to a touch liquid crystal display device.

Discussion of the Related Art

As information society has developed, demands for display devices for displaying images have been increasing in various forms. Recently, various flat display devices such as liquid crystal display devices (LCDs), plasma display panels (PDPs), and organic light emitting diodes (OLEDs) have been utilized.

Among the flat display devices, the LCDs are being widely used due to having advantages of miniaturization, being light weight, thinness, and low power driving.

Recently, in various information display electronic devices such as notebook computers, smart phones, and the like, a touch function is required for a display device. To this end, a touch sensor is applied to LCDs.

Generally, a touch sensor is manufactured as a separate touch panel and attached to a display surface of a liquid crystal panel in an add-on type. In addition, a cover window is attached to an upper surface of the touch panel in a state in which the touch panel is attached to the liquid crystal panel.

In such the touch panel, a plurality of x touch electrodes extending in a horizontal direction, which is a row direction (or an x direction), and a plurality of y touch electrodes extending in a vertical direction, which is a column direction (or a y direction), are formed in an active region as a display region of a liquid crystal panel. A plurality of touch lines, which are connected to both ends of the plurality of x touch electrodes and extend to a touch integrated circuit (IC) positioned at a lower end side of the touch panel in the vertical direction are formed in non-active regions at both sides of the touch panel in the horizontal direction.

As described above, the related art touch panel requires a non-active region having a wide width because a plurality of touch lines should be provided.

Accordingly, the cover window positioned on the touch panel has a size sufficient to cover the entire touch panel, and includes a black matrix for covering the non-active region to block the front visibility of the non-active region.

Therefore, since the related art touch LCD requires a non-display portion i.e., a bezel portion having a considerable width, there is a limit in implementing a narrow bezel.

In addition, set makers who receive LCDs from display device manufacturers and attach the LCDs to information display electronic devices to produce final products require display devices which are appropriate for the design of their various electronic devices. For example, the set maker requires a logo or a camera hole in a cover window of the display device.

As a result, the display device manufacturer produces small quantity and multiple types of products, and thus manufacturing efficiency of the display device is significantly lowered.

The set maker should use a display device having a cover window of a wide bezel larger than a liquid crystal panel, and thus a degree of freedom in designing a portion of an electronic device in which the display device is mounted is significantly limited.

SUMMARY

Accordingly, the present disclosure is directed to a liquid crystal display device including the same that substantially obviate one or more of the problems due to limitations and disadvantages of the related art.

An object of the present disclosure is to provide a liquid crystal display device that can effectively implement a narrow bezel for a touch liquid crystal display device, improve manufacturing efficiency of the liquid crystal display device, and improve a design freedom of an electronic device on which the liquid crystal display device is mounted.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present disclosure, as embodied and broadly described herein, a liquid crystal display device includes: a liquid crystal panel in which a display region in which a plurality of touch blocks are arranged and a non-display region around the display region are defined, wherein the liquid crystal panel includes a first substrate and a second substrate facing each other and a polarizer attached to an outer surface of the first substrate, and a touch electrode is provided in each of the plurality of touch blocks; and a cover window attached to an outer surface of the polarizer through an adhesive layer, wherein the cover window has a size greater than that of the display region and smaller than or equal to that of the first substrate.

It is to be understood that both the foregoing general description and the following detailed description are explanatory and are intended to provide further explanation of the embodiments as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to exemplary embodiments, examples of which are illustrated in the accompanying drawings. The same reference numbers may be used throughout the drawings to refer to the same or like parts.

First Embodiment

Figure 1:
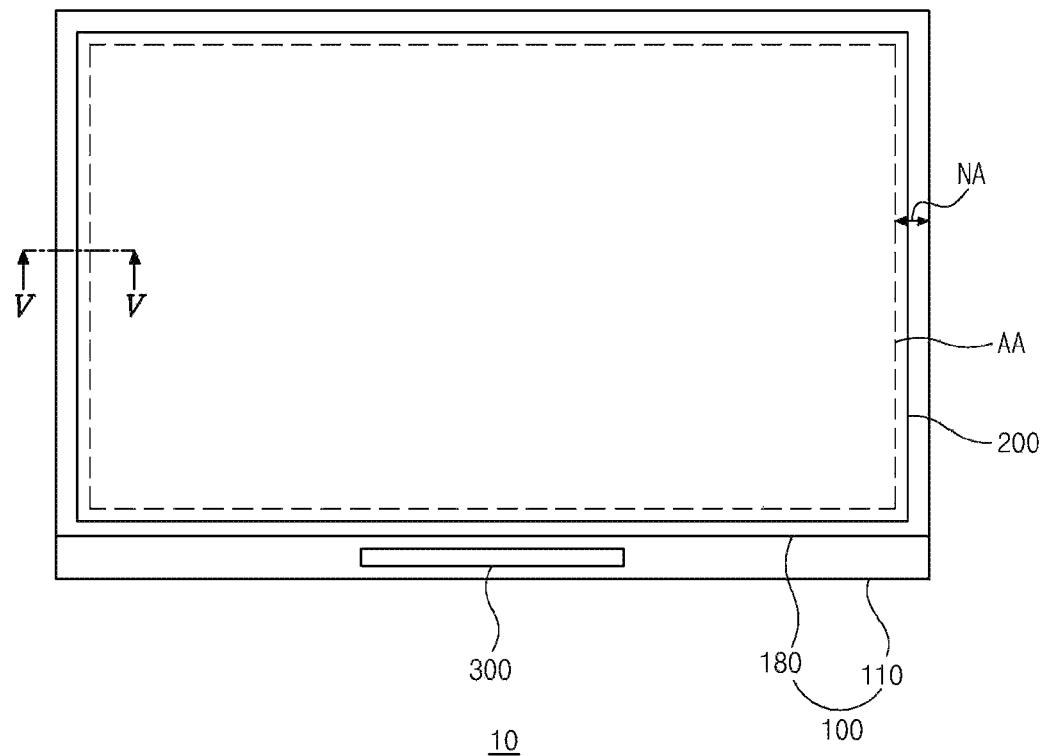
FIG. 1 is a plan view schematically illustrating a touch liquid crystal display device according to a first embodiment of the present disclosure.
Figure 2:
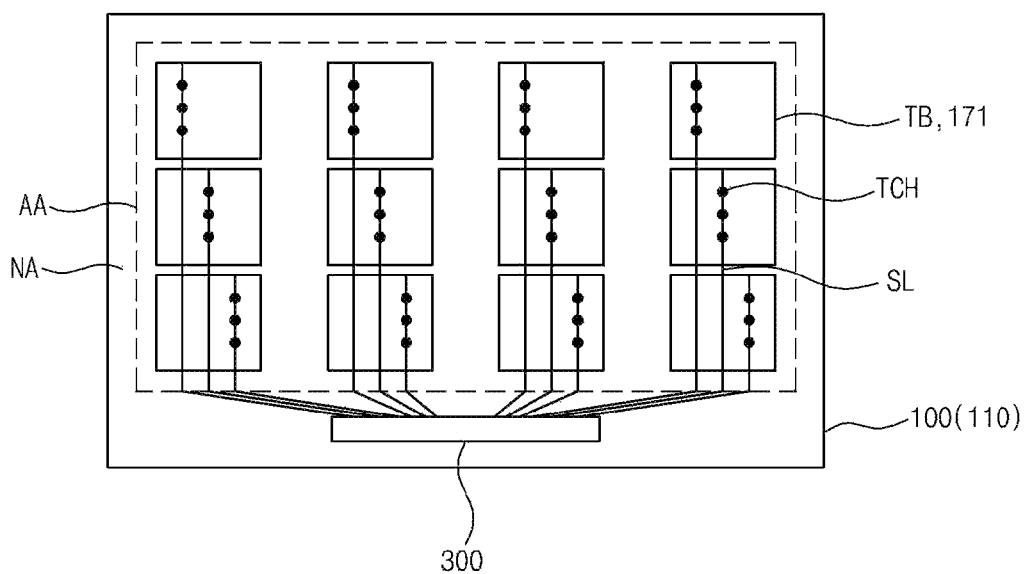
FIG. 2 is a plan view schematically illustrating a liquid crystal panel according to the first embodiment of the present disclosure.

FIG. 1 is a plan view schematically illustrating a touch liquid crystal display device according to a first embodiment of the present invention, and FIG. 2 is a plan view schematically illustrating a liquid crystal panel according to the first embodiment of the present disclosure.

Referring to FIGS. 1 and 2, a touch liquid crystal display device 10 according to this embodiment may include a liquid crystal panel 100 displaying an image and including touch elements and a cover window 200 attached onto a display surface of the liquid crystal panel 100.

Although not shown in the drawings, a backlight unit which supplies light to the liquid crystal panel 100 may be disposed under the liquid crystal panel 100.

As the backlight unit, an edge type backlight unit in which a light source such as a light emitting diode (LED) or the like is disposed at a side surface of the liquid crystal panel 100, or a direct type backlight unit in which a light source is disposed below the liquid crystal panel 100 may be used.

The liquid crystal panel 100 of this embodiment may be an in-cell type liquid crystal panel in which touch electrodes 171 serving as self-capacitive type touch elements are formed inside the panel. As another example, the liquid crystal panel 100 may be an on-cell type liquid crystal panel in which self-capacitive touch electrodes are directly formed on an outer surface of the liquid crystal panel.

In this embodiment, for the purpose of explanations, the in-cell type liquid crystal panel is described by way of example.

In the in-cell type liquid crystal panel 100, in an image display section when an image is displayed, the touch electrode 171 having a touch sensing function may be applied with a common voltage and function as a common electrode 171. In addition, in a touch sensing section between the image display sections, the touch electrode 171 may be applied with a touch driving signal and function as an electrode for touch sensing.

The in-cell type liquid crystal panel 100 may include an array substrate 110 as a first substrate, an opposite substrate 180 as a second substrate, for example, a color filter substrate facing the array substrate 110, and a liquid crystal layer interposed between the array substrate 110 and the color filter substrate 180.

In one embodiment, as the liquid crystal panel 100, a liquid crystal panel may include a pixel electrode and a touch electrode 171 i.e., a common electrode, which produce an electric field to operate the liquid crystal layer, and formed together at the array substrate 110.

For example, an in-plane switching (IPS) type liquid crystal panel or an advanced high-performance IPS (AH-IPS) type liquid crystal panel may be used. In this embodiment, for the purpose of explanations, an AH-IPS type liquid crystal panel 100 for generating a fringe field is used by way of example.

The liquid crystal panel 100 includes a display region AA, which is a region on which an image is displayed, and a non-display region NA around (or surrounding) the display region AA. A plurality of pixel regions are arranged in the display region AA in a matrix form in a row direction and a column direction.

A plurality of touch blocks TB may be arranged in the liquid crystal panel 100 in a matrix form in the row direction and the column direction. Each of the touch blocks TB includes a plurality of pixel regions neighboring in the row direction and the column direction as a unit group.

In the array substrate 110 of the liquid crystal panel 100, the touch electrodes 171 i.e., the common electrodes are formed separately in the respective touch blocks TB.

The common electrode formed in each of the touch blocks TB is physically separated from, is patterned in the form of being spaced apart from, the common electrodes 171 of the neighboring touch blocks TB.

In other words, the common electrodes formed in the neighboring touch blocks TB are electrically disconnected from each other so that the touch blocks TB may be individually (or independently) driven.

Sensing lines SL connected to the respective touch blocks TB are formed to extend in a direction on the array substrate 110 of the liquid crystal panel 100. For example, the sensing lines SL may be formed in a column direction or vertical direction, which is an extension direction of a data line.

The sensing line SL is connected to the common electrode of the corresponding touch block TB through a contact hole TCH formed in the corresponding touch block TB to transmit a corresponding driving signal to the common electrode.

In this regard, a common voltage is applied to the sensing line SL to be transmitted to the corresponding common electrode during every frame as the image display section. Accordingly, an electric field may be generated between the pixel electrode and the common electrode in each of the pixel regions arranged in the touch block TB to drive a liquid crystal, and thus an image may be displayed.

A touch driving signal is applied to the sensing line SL to be transmitted to the common electrode i.e., the touch electrode 171, during a blank section between neighboring frames that is a touch sensing section between the image display sections.

Further, a sensing signal corresponding to a capacitance change amount of each touch block TB according to presence or absence of a touch is detected by the common electrode and applied to the sensing line SL. Using the detected sensing signal, whether a user touches is determined.

As described above, since the common electrode formed on the touch block TB may function not only as an electrode for generating an electric field but also as a touch electrode for detecting the user's touch, and thus the in-cell type liquid crystal panel 100 can be implemented and a thickness of the liquid crystal panel 100 can be reduced.

The opposite substrate 180 facing the array substrate 110 may be formed to have a smaller size than the array substrate 110. For example, the opposite substrate 180 may be disposed so as not to cover a portion of the non-display region NA at a lower end portion, in which a panel drive circuit 300 is disposed, as a side edge portion of the array substrate 110 and to expose the panel drive circuit 300.

The panel drive circuit 300 may be manufactured, for example, in an IC form and mounted on the non-display region NA of the array substrate 110 in a chip-on-glass (COG) manner.

The panel drive circuit 300 generates various signals for driving the liquid crystal panel 100 and supplies the signals to the liquid crystal panel 100 to drive the liquid crystal panel 100.

In this regard, for example, the panel drive circuit 300 may output a gate signal to a gate line and output a data signal to a data line. In addition, the panel drive circuit 300 selectively outputs a common voltage or touch driving signal to the sensing line SL. Further, the panel drive circuit 300 may receive a sensing signal generated at the common electrode 171 through the sensing line SL.

The panel drive circuit 300 may include a data drive circuit for driving the data line, a gate drive circuit for driving the gate line, and a touch sensing circuit for driving the sensing line. In this case, the data drive circuit, the gate drive circuit, and the touch sensing circuit may be formed as separate ICs. Alternatively, at least two of these circuits integrated as one IC may be used. In this embodiment, the panel drive circuit 300 in which the data drive circuit, the gate drive circuit, and the touch sensing circuit are integrated a single IC is described by way of example.

In another example, the IC type panel drive circuit 300 may be mounted on a flexible circuit film and connected to the liquid crystal panel 100 through the flexible circuit film.

Figure 3:
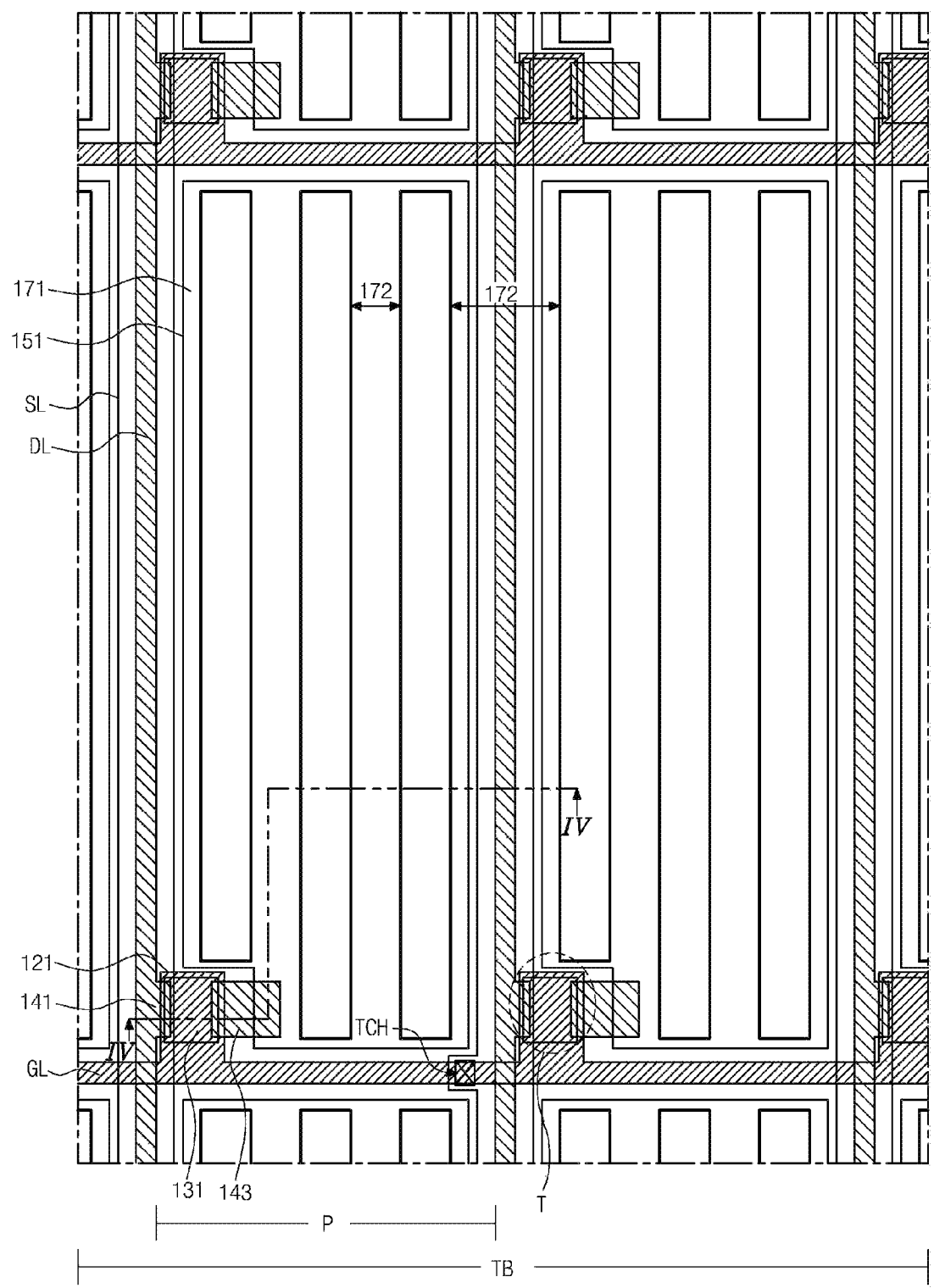
FIG. 3 is a plan view illustrating a portion of a touch block of an array substrate of the liquid crystal panel according to the first embodiment of the present disclosure.
Figure 4:
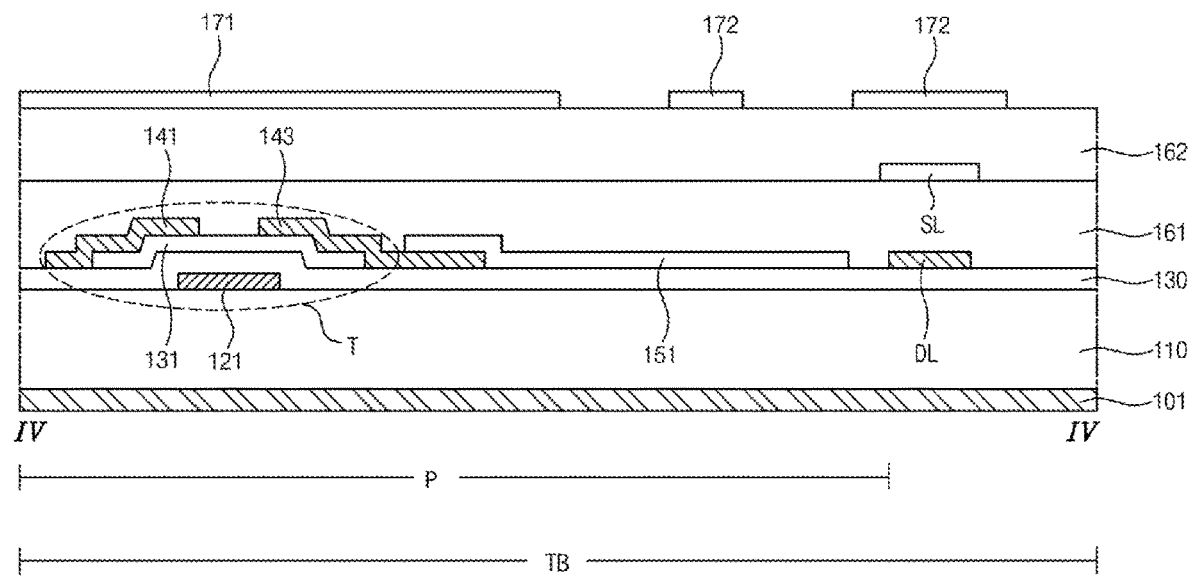
FIG. 4 is a cross-sectional view taken along a line IV-IV of FIG. 3 according to the first embodiment of the present disclosure.

An internal structure of the liquid crystal panel 100 according to this embodiment is described in more detail further with reference to FIGS. 3 and 4.

FIG. 3 is a plan view illustrating a portion of the touch block of the array substrate of the liquid crystal panel according to the first embodiment of the present disclosure, and FIG. 4 is a cross-sectional view taken along a line IV-IV of FIG. 3 according to the first embodiment.

Referring to FIGS. 3 and 4, a plurality of gate lines GL extending in a row direction as a first direction and a plurality of data lines DL extending in a column direction as a second direction are formed on the array substrate 110.

The plurality of pixel regions P arranged in a matrix form are defined by the gate lines GL and the data lines DL crossing each other in this manner.

A thin film transistor T, which is connected to the gate line GL and the data line DL, is formed in each of the pixel regions P. A gate insulating film 130 is formed between the gate line GL and the data line DL.

The thin film transistor T may include a gate electrode 121 connected to the gate line GL, a semiconductor layer 131 positioned on the gate electrode 121, and a source electrode 141 and a drain electrode 143 which are disposed on the semiconductor layer 131 to be spaced apart from each other. The source electrode 141 is connected to the data line DL.

A pixel electrode 151 connected to the drain electrode 143 of the thin film transistor T is formed in each pixel region P.

The common electrode i.e., the touch electrode 171 may be formed in each touch block TB and be disposed on the pixel electrode 151 with at least one insulating film interposed between the common electrode and the pixel electrode 151 to form a fringe field. For example, first and second passivation layers 161 and 162 made of an insulating material may be formed between the pixel electrode 151 and the common electrode.

The common electrode may include a plurality of electrode patterns 172 in a bar shape facing the pixel electrode 151 to correspond to each pixel region P.

The sensing line SL connected to each touch block TB to transmit a driving signal to each touch block TB may be formed on the first passivation layer 161. The sensing line SL may extend in the corresponding touch block TB along an extension direction of the data line DL and may overlap the data line DL. As such, when the sensing line SL is disposed to overlap the data line DL as a non-display element, reduction of an aperture ratio by the sensing line SL can be prevented, and a width of the sensing line SL can be maximized thus its resistance can be reduced.

The second passivation layer 162 may be disposed between the sensing line SL and the common electrode 171, and the sensing line SL and the common electrode may be configured to be in contact with each other through the contact hole TCH formed in the second passivation layer 162.

The array substrate 110 configured as described above may be coupled to the opposite substrate 180 with a liquid crystal layer interposed between the array substrate 110 and the opposite substrate 180 so that the liquid crystal panel 100 may be manufactured.

A first polarizer 101 may be attached to an outer surface of the array substrate 110. In addition, a second polarizer 102 (see FIG. 5) may be attached to an outer surface of the opposite substrate 180.

The cover window 200 for protecting a front of the liquid crystal panel 100 is attached to a front display surface of the in-cell liquid crystal panel 100. In other words, the cover window 200 is attached to a display surface of the opposite substrate 180.

In this embodiment, the cover window 200 is formed to have a size (or an area) greater than that of the display region AA of the liquid crystal panel 100 and smaller than that of the liquid crystal panel 100.

In other words, an edge (or an outer edge) of the cover window 200 is positioned outside an outer edge (or a boundary) of the display region AA and inside an edge (or an outer edge) of the opposite substrate 180 which is a substrate onto which the cover window 200 is attached.

In other words, the cover window 200 is formed to cover the entire display region AA of the opposite substrate 180 and a portion of the non-display region NA of the opposite substrate 180.

As described above, in this embodiment, the cover window 200 may be formed to have a size smaller than that of the liquid crystal panel 100. This is because the touch elements are implemented in an in-cell structure inside the liquid crystal panel 100.

In this regard, as described above, the touch electrode 171 as a touch element is embedded into the liquid crystal panel 100 and senses a touch in a self-capacitive manner.

In addition, the sensing line SL as a touch line connected to each touch electrode 171 extends across an inside of the display region AA and is connected to the panel drive circuit 300, which is positioned at a lower end side, without extending along the non-display regions NA at both sides of the display region AA.

As described above, in this embodiment, there is no need to use a separate touch panel and provide touch lines in a non-active region of the touch panel like the related art.

Therefore, there is no need to provide a cover window having a size, which is sufficient to cover the non-active region of the touch panel and cover the non-active region with a black matrix, like the related art.

Accordingly, the cover window 200 having a size smaller than that of the liquid crystal panel 100 can be implemented, as described in this embodiment.

The cover window 200 having a size smaller than that of the liquid crystal panel 100 can be implemented even when the touch electrodes are formed in a self-capacitive type on-cell structure rather than the in-cell structure. In the on-cell structure, the touch electrodes may be formed on an outer surface of one of the array substrate 110 and the opposite substrate 180 and in respective touch blocks, and in this case, the touch electrode may not have a function of the common electrode.

Figure 5:
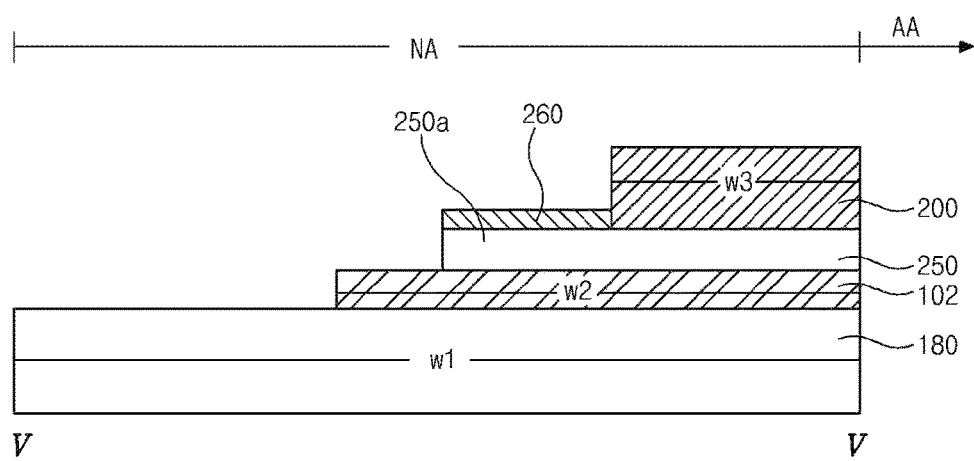
FIG. 5 is a cross-sectional view taken along a line V-V of FIG. 1 according to the first embodiment of the present disclosure.

The cover window 200 of this embodiment is described in more detail further with reference to FIG. 5.

FIG. 5 is a cross-sectional view taken along a line V-V of FIG. 1. FIG. 5 shows a structure of a portion of the non-display region at a left side of the liquid crystal display device 10, and this structure may be equally or similarly applied to a portion of the non-display region at another side(s) of the liquid crystal display device 10. In FIG. 5, the array substrate is omitted for the purpose of explanations.

Referring to FIG. 5, the second polarizer 102 is attached to the outer surface of the opposite substrate 180 of the liquid crystal panel 100.

The cover window 200 is attached to an outer surface of the second polarizer 102. In this regard, the cover window 200 and the second polarizer 102 may be coupled to each other through an adhesive layer 250 which uses a light-transmitting optical adhesive, for example, an optically clear adhesive (OCA).

In this case, an edge (or an end) of the cover window 200 is positioned outside the display region AA i.e., inside the non-display region NA. The edge of the cover window 200 is positioned inside the edge of the opposite substrate 180.

In other words, the cover window 200 is positioned between an end of the display region AA and the edge of the opposite substrate 180.

The edge of the second polarizer 102 is positioned outside the edge of the cover window 200.

The adhesive layer 250 is formed to extend outward from the cover window 200 and has a size greater than that of the cover window 200. In other words, an end of the adhesive layer 250 is positioned outside the edge of the cover window 200. A portion of the adhesive layer 250, which is not covered with the cover window 200 and extends outward, is referred to as an outer extension portion (or outer edge portion) 250a.

As described above, the adhesive layer 250 is formed to have an area greater than that of the cover window 200, and thus the entire lower surface of the cover window 200 may be attached to the liquid crystal panel 100 so that attachment stability of the cover window 200 may be ensured.

In terms of ensuring optical characteristics in the non-display region NA, it is advantageous that the adhesive layer 250 is formed to have an area greater than that of the cover window 200.

The outer extension portion 250a of the adhesive layer 250 may be covered with a protective layer (or a protective film) 260.

In this regard, when the outer extension portion 250a is exposed to the outside, due to an adhesion characteristic of the outer extension portion 250a, a problem such as adherence of foreign matter to the outer extension portion 250a, unintentional adherence of other structures to the outer extension portion 250a, or the like may occur. Therefore, the protective layer 260 may be attached to the outer extension portion 250a in order to prevent the outer extension portion 250a from being exposed directly to the outside.

In consideration of various design factors such as minimum optical characteristics, process variations, adhesion characteristics and the like, a width w2 of a portion of the second polarizer 102 in the non-display region NA and a width w3 of the cover window 200 in the non-display region NA may each be formed to have a specific ratio with respect to a width w1 of the non-display region NA.

In this regard, a ratio (w2/w1) of a second width w2 of the second polarizer 102 to a first width w1 of the non-display region NA of the liquid crystal panel 100, more specifically the opposite substrate 180, ranges from about 0.4 to 0.6 and in another embodiment ranges from about 0.5 to 0.6, but not limited thereto.

A ratio (w3/w2) of a third width w3 of the cover window 200 to the second width w2 of the second polarizer 102 ranges from about 0.4 to 0.6 and in another embodiment ranges from about 0.5 to 0.6, but not limited thereto. In this case, a ratio (w3/w1) of the third width w3 of the cover window 200 to the first width w1 of the non-display region NA of the opposite substrate 180 ranges from about 0.16 to 0.36 and in another embodiment ranges from about 0.25 to 0.36.

As described above, according to this embodiment, using an in-cell (or on-cell) type liquid crystal panel, the cover window having a size greater than that of the display region and smaller than that of the liquid crystal panel can be formed.

Accordingly, the touch liquid crystal display device can have an extremely narrow bezel. There is no need to form a separate black matrix in the cover window.

Further, the liquid crystal display device of this embodiment can be used as a touch liquid crystal display device which is substantially standardized regardless of the design of electronic devices on which display devices are mounted, and thus manufacturing efficiency of the display device can be maximized.

Further, electronic device set makers can use the standardized touch liquid crystal display device with a narrow bezel, and thus a degree of freedom of design for electronic devices can be maximized.

Second Embodiment

Figure 6:
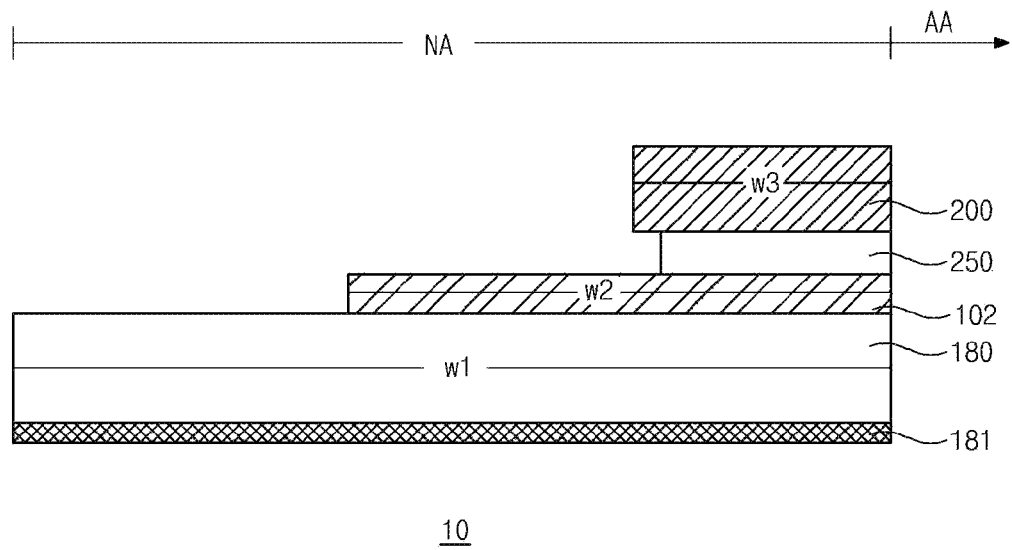
FIG. 6 is a cross-sectional view illustrating a non-display region of a liquid crystal display device according to a second embodiment of the present disclosure.

FIG. 6 is a cross-sectional view illustrating a non-display region of a liquid crystal display device according to a second embodiment of the present disclosure, which corresponds to the portion shown in FIG. 5. An array substrate is omitted for the purpose of explanations.

A detailed explanations of the same or similar components as that in the first embodiment may be omitted.

Referring to FIG. 6, in a liquid crystal display device 10 of this embodiment, an adhesive layer 250 is formed to have a size (or an area) smaller than that of a cover window 200.

In the liquid crystal display device 10, a second polarizer 102 is attached to an outer surface of an opposite substrate 180 of a liquid crystal panel 100.

The cover window 200 is attached to an outer surface of the second polarizer 102 through the adhesive layer 250.

In this case, an edge of the cover window 200 is positioned outside a display region AA and inside a non-display region NA. The edge of the cover window 200 is positioned inside an edge of the opposite substrate 180.

An edge of the second polarizer 102 is positioned outside the edge of the cover window 200.

The adhesive layer 250 is formed to have a size smaller than that of the cover window 200 so as to be covered with the cover window 200 without being exposed to the outside of the cover window 200. In other words, an end of the adhesive layer 250 is positioned inside the edge of the cover window 200. In this case, the end of the adhesive layer 250 is positioned outside the display region AA.

As described above, in this embodiment, the outer extension portion 250a (see FIG. 5) of the first embodiment is not provided, and the entire adhesive layer 250 is covered with the cover window 200 and is not exposed to the outside.

Accordingly, a problem, such as unintentional adherence of foreign matter or other structures onto the adhesive layer 250, can be prevented. Therefore, there is no need to provide the protective layer 260 (see FIG. 5) for preventing the exposure of the outer extension portion 250a of the first embodiment, and thus it is advantageous in terms of process as compared to the first embodiment.

Since the adhesive layer 250 is formed to be recessed inward from the edge of the cover window 200, an air layer is present below the cover window 200 where the adhesive layer 250 is not formed and thus optical characteristics may be degraded.

In order to prevent the degradation of the optical characteristics, a black matrix 181 which substantially covers the entire non-display region NA may be formed on the opposite substrate 180. In this case, it may be advantageous in process that the black matrix 181 is formed on an inner surface of the opposite substrate 180. In this regard, the black matrix 181 may be formed on the entire non-display region NA in a process of forming the black matrix in the display region AA of the opposite substrate 180. Alternatively, a black matrix may be formed on an outer surface of the opposite substrate 180.

According to this embodiment, similar to the first embodiment, the cover window having a size greater than that of the display region and smaller than that of the liquid crystal panel can be formed using an in-cell (or on-cell) type liquid crystal panel.

Accordingly, the touch liquid crystal display device can have an extremely narrow bezel. There is no need to form a separate black matrix in the cover window.

Further, the liquid crystal display device of this embodiment can be used as a touch liquid crystal display device which is substantially standardized regardless of the design of electronic devices on which display devices are mounted, and thus manufacturing efficiency of the display device can be maximized.

Further, the electronic device set makers can use the standardized touch liquid crystal display device with a narrow bezel, and thus a degree of freedom of design for electronic devices can be maximized.

Third Embodiment

Figure 7:
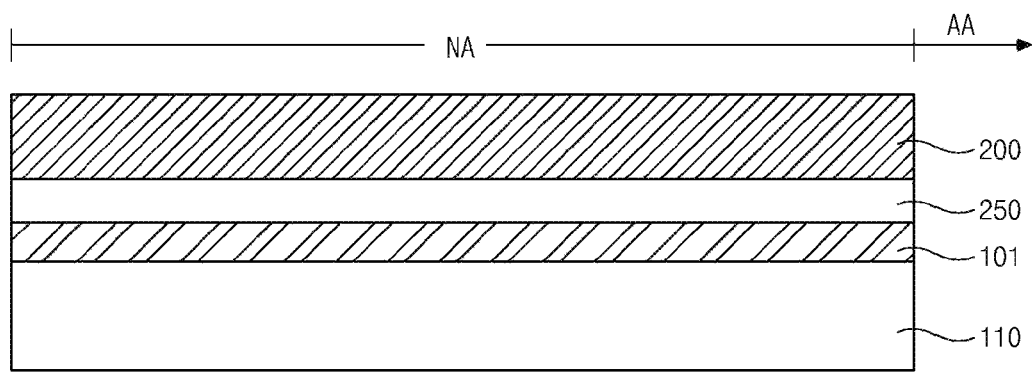
FIG. 7 is a cross-sectional view illustrating a non-display region of a liquid crystal display device according to a third embodiment of the present disclosure.

FIG. 7 is a cross-sectional view illustrating a non-display region of a liquid crystal display device according to a third embodiment of the present disclosure. In FIG. 7, an opposite substrate of a liquid crystal panel is omitted for the purpose of explanation.

Detailed explanations of the same or similar components as in each of the first and second embodiments may be omitted.

Referring to FIG. 7, a liquid crystal display device 10 of this embodiment has a structure in which a liquid crystal panel has a vertical arrangement inverted from that of each of the liquid crystal panels in the first and second embodiments. In other words, the liquid crystal display device 10 of this embodiment has a structure in which an array substrate 110 is disposed at a display surface side of the liquid crystal display device 10 and an opposite substrate is disposed under the array substrate 110.

In the liquid crystal display device 10 having such the structure, a first polarizer 101 is attached to an outer surface of the array substrate 110 of the liquid crystal panel, and a cover window 200 is attached to an outer surface of the first polarizer 101 through an adhesive layer 250.

In this case, the cover window 200 may be formed to have substantially the same size as the array substrate 110. In other words, the cover window 200 may be formed such that an edge thereof coincides with an edge of the array substrate 110.

The first polarizer 101 may be formed to have substantially the same size as the array substrate 110 and the cover window 200.

Further, the adhesive layer 250 may be formed to have substantially the same size as the first polarizer 101, the array substrate 110, and the cover window 200.

As described above, in this embodiment, the liquid crystal display device 10 may be formed to have a so-called just structure in which the cover window 200 has the same size as the array substrate 110, and also has the same size as the first polarizer 101 and the adhesive layer 250 which are interposed between the cover window 200 and the array substrate 110.

In this regard, the array substrate 110 has a greater size than the opposite substrate and substantially determines a size of the liquid crystal panel. Therefore, in the case that the cover window 200 is attached to the array substrate 110 rather than the opposite substrate, the just structure can be more effectively implemented.

In such the structure, since the sizes of the cover window 200, the first polarizer 101, and the adhesive layer 250 with respect to the array substrate 110 need not be considered as design factors, the structure and processes of the liquid crystal display device 10 may be simplified.

Further, overall uniform optical characteristics can be ensured, and the attachment stability of the cover window 200 can be ensured.

According to this embodiment, similar to the first or second embodiment, using an in-cell (or on-cell) liquid crystal panel, the cover window can be formed to have a size greater than that of the display region and equal to that of the liquid crystal panel.

Accordingly, the touch liquid crystal display device can have an extremely narrow bezel. There is no need to form a separate black matrix in the cover window.

Further, the liquid crystal display device of this embodiment can be used as a touch liquid crystal display device which is substantially standardized regardless of the design of electronic devices on which display devices are mounted, and thus manufacturing efficiency of the display device can be maximized.

Further, the electronic device set makers can use the standardized touch liquid crystal display device with a narrow bezel, and thus a degree of freedom of design for electronic devices can be maximized.

In the third embodiment, similar to the first or second embodiment, the cover window may be formed to have a size smaller than that of the array substrate.

Further, in the first or second embodiment, similar to the third embodiment, the cover window may be attached to the opposite substrate in a just structure.

In the embodiments of the present invention, a cover window having a size greater than that of a display region and smaller than or equal to that of a liquid crystal panel can be formed using an in-cell (or on-cell) type liquid crystal panel.

Accordingly, a touch liquid crystal display device can have an extremely narrow bezel. There is no need to form a separate black matrix in the cover window.

Further, a liquid crystal display device can be used as a touch liquid crystal display device which is substantially standardized regardless of the design of electronic devices on which display devices are mounted, and thus manufacturing efficiency of the display device can be maximized.

Further, the electronic device set makers can use a standardized touch liquid crystal display device with a narrow bezel, and thus a degree of freedom of design for electronic devices can be maximized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a liquid crystal panel in which a display region in which a plurality of touch blocks are arranged and a non-display region around the display region are defined, wherein the liquid crystal panel includes a first substrate and a second substrate facing each other and a polarizer attached to an outer surface of the first substrate, and a touch electrode is provided in each of the plurality of touch blocks;
    a cover window attached to an outer surface of the polarizer through an adhesive layer,
    wherein the cover window has a size greater than that of the display region and smaller than that of the first substrate,
    wherein the polarizer has a size greater than that of the cover window,
    wherein an edge of the polarizer is positioned outside of an edge of the cover window and is disposed between the edge of the cover window and an edge of the first substrate, and
    wherein an edge of the adhesive layer is disposed between the edge of the cover window and the edge of the polarizer along a horizontal direction parallel to the outer surface of the first substrate or the edge of the cover window is disposed between the edge of the adhesive layer and the edge of the polarizer along the horizontal direction.

2. The liquid crystal display device of claim 1, wherein the adhesive layer has an outer extension portion that extends outward from the cover window, and
    wherein the outer extension portion is covered with a protective layer.

3. The liquid crystal display device of claim 1, wherein an end of the adhesive layer is positioned inside the cover window.

4. The liquid crystal display device of claim 3, wherein a black matrix is formed on the first substrate to entirely cover the non-display region.

5. The liquid crystal display device of claim 1, wherein a ratio (w2/w1) of a second width w2 of a portion of the polarizer, which is positioned in the non-display region, to a first width w1 of the non-display region ranges from 0.4 to 0.6.

6. The liquid crystal display device of claim 5, wherein a ratio (w3/w2) of a third width w3 of a portion of the cover window, which is positioned in the non-display region, to the second width w2 of the portion of the polarizer, which is positioned in the non-display region, ranges from 0.4 to 0.6.

7. The liquid crystal display device of claim 1, wherein the first substrate is one of an array substrate and an opposite substrate facing the array substrate.

8. The liquid crystal display device of claim 1, wherein the touch electrode is configured in an in-cell structure or an on-cell structure.

9. The liquid crystal display device of claim 1, further comprising a sensing line connected to the touch electrode and connected to a panel drive circuit across the display region.

10. The liquid crystal display device of claim 9, wherein the panel drive circuit is disposed on a side edge portion of the second substrate, and is not covered by the cover window.

11. The liquid crystal display device of claim 9, wherein the sensing line overlaps the touch electrode and a data line in the display region.

* * * * *